United States Patent
Cohn et al.

[11] 3,904,169
[45] Sept. 9, 1975

[54] VALVE CONSTRUCTION

[75] Inventors: Lawrence P. Cohn, Clarkston; Larry G. Turner, Waterford; Dennis W. Crawford, Pontiac, all of Mich.

[73] Assignee: Bristol Products, Inc., Bristol, Ind.

[22] Filed: Oct. 19, 1973

[21] Appl. No.: 407,936

[52] U.S. Cl. .................. 251/86; 251/366; 251/223
[51] Int. Cl.² ......................................... F16K 27/00
[58] Field of Search .......... 251/86, 85, 84, 88, 366, 251/223; 137/625.26, 559, 625.27

[56] References Cited
UNITED STATES PATENTS

| | | | |
|---|---|---|---|
| 369,528 | 9/1887 | Kaiser | 137/625.26 |
| 853,246 | 5/1907 | Lamping | 137/625.26 |
| 952,048 | 3/1910 | Resek | 137/625.26 |
| 1,167,027 | 1/1916 | Stephenson | 137/625.26 |
| 1,508,102 | 9/1924 | Holt | 251/86 |
| 2,126,897 | 8/1938 | Lamar | 137/315 |
| 2,883,142 | 4/1959 | Colonna | 137/625.26 X |
| 2,923,318 | 2/1960 | Monson | 251/84 X |
| 3,229,710 | 1/1966 | Keller | 137/315 |
| 3,472,481 | 10/1969 | Spies, Jr. | 251/85 |
| 3,503,586 | 3/1970 | Bordes | 137/315 X |
| 3,552,714 | 1/1971 | Manville | 251/88 |

Primary Examiner—Martin P. Schwadron
Assistant Examiner—Robert J. Miller
Attorney, Agent, or Firm—Oltsch & Knoblock

[57] ABSTRACT

A valve for use in domestic water systems wherein at least the bonnet, stem, stem-mounted closure and the hand grip can be formed of plastic material. O-rings are provided as seals and as means to retard rotation of the closure in the bonnet as the stem advances the closure toward the valve seat and retracts it from the valve seat. The closure member and stem interfit loosely and are interconnected by a snap fit of a circumferential lip in a mating groove so that the closure member has a free-floating action upon the stem and a self-seating abutment with a valve seat.

6 Claims, 5 Drawing Figures

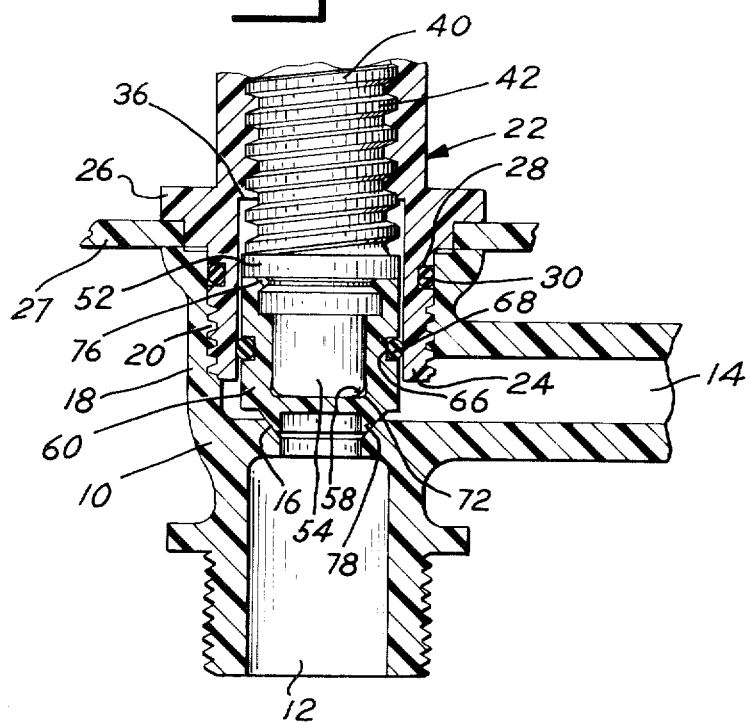
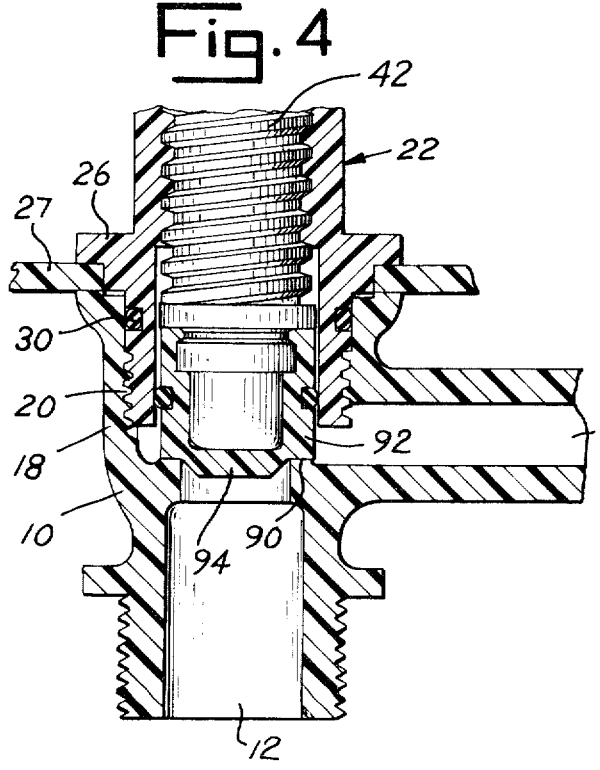
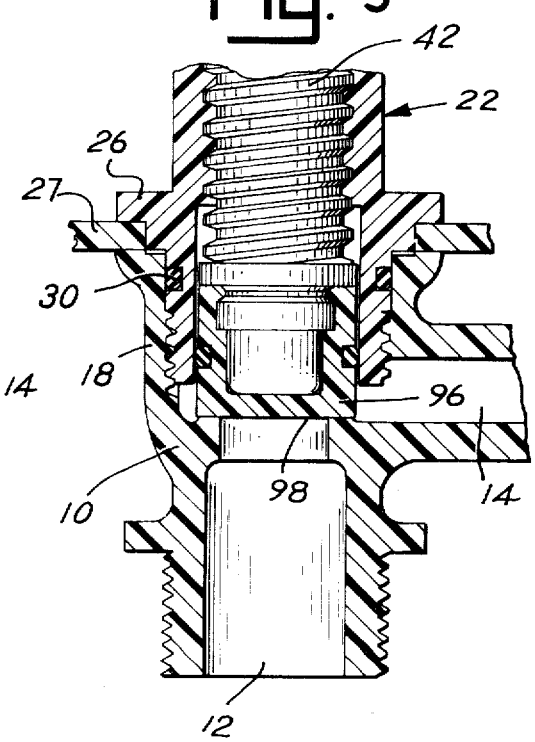

VALVE CONSTRUCTION

This invention relates to improvements in valve constructions, such as faucets, bibs and flow control valves.

Heretofore it has been customary to produce the major portions, such as the body, the bonnet, and the stem and the head, of bib type valves from metal, with limited use of plastic and non-metallic materials. It is one of the primary objects of this invention to provide a novel construction of valve in which the principal parts thereof may be formed of non-metallic materials.

Another object of the invention is to provide a valve of non-metallic material which is simple in construction, inexpensive to manufacture and assemble, and adapted for use in both hot and cold household water lines and in valves for other uses.

A further object of the invention is to provide a swivel type stem-mounted sealing or closure member of novel construction which will not loosely spin upon rotation of the mounting stem, and which is susceptible of limited rocking on the stem to accommodate sealing abutment upon inaccurate valve seats.

A further object is to provide a valve of this character in which selected parts can be assembled with a snap fit to eliminate the need for securing screws therefor.

A further object is to provide a valve utilizing O-ring sealing means.

Other objects will be apparent from the following specification.

In the drawings:

FIG. 3 is a fragmentary axial sectional view of the valve in closed position.

FIG. 4 is a fragmentary axial sectional view of a modified construction of the valve.

FIG. 5 is a fragmentary axial sectional view of another modified construction of the valve.

Figure 1:
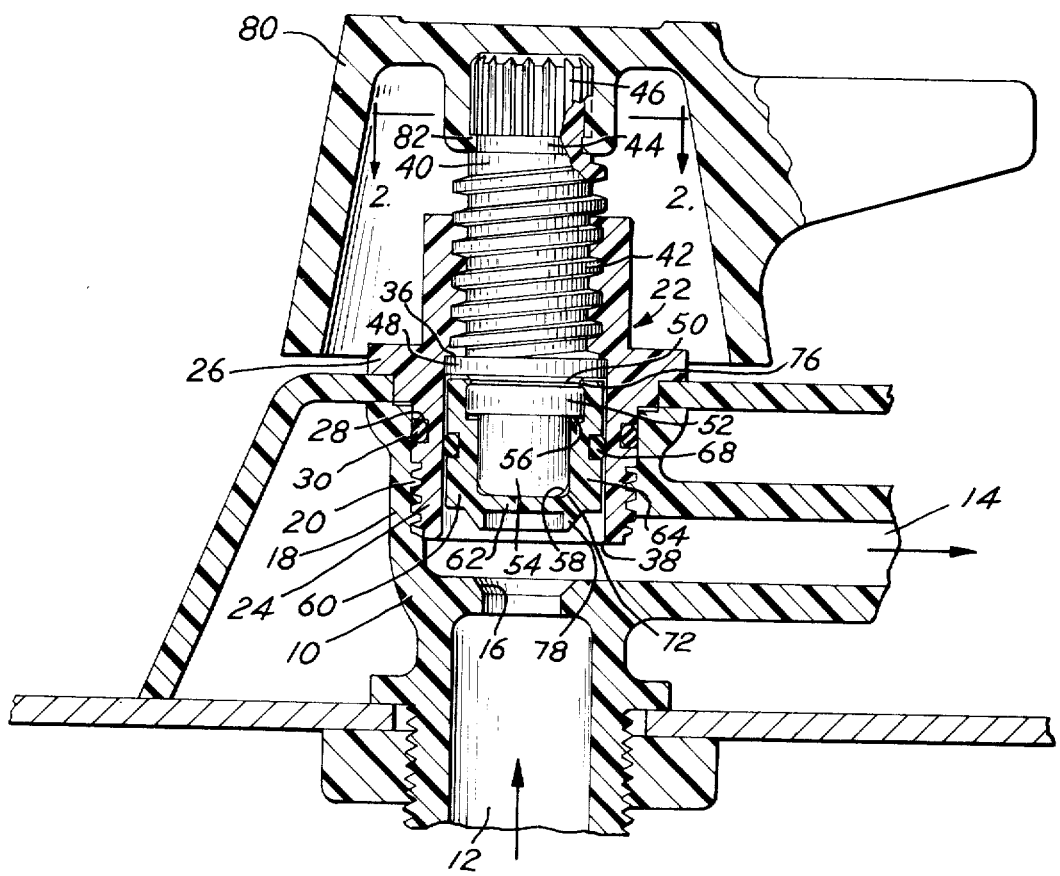
FIG. 1 is an axial sectional view of the preferred valve construction used in a faucet shown in open position.
Figure 2:
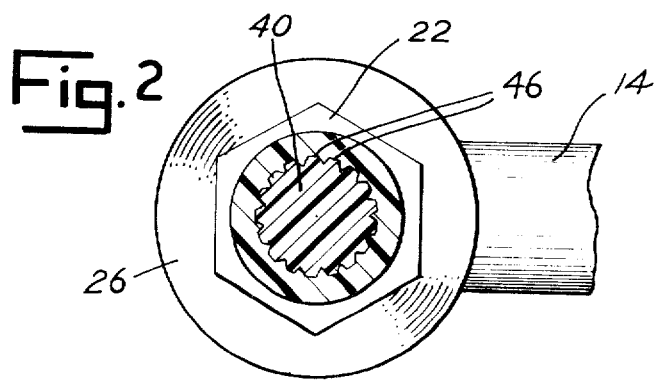
FIG. 2 is a transverse sectional view taken on line 2—2 of FIG. 1.

Referring to the drawings, and, particularly to FIG. 1 which illustrates the application of the valve construction to a faucet, the numeral 10 designates the body of a faucet having an inlet 12 and an outlet 14. A restricted opening between the inlet and the outlet provides a valve seat 16, here illustrated as beveled or tapered. The body 10 includes an upper tubular portion 18 internally screw threaded at 20 spaced below its upper edge, and a stepped cylindrical bore projecting above said threaded portion.

A bonnet 22 has a lower externally screw threaded portion 24 secured in the threaded portion 20 of the body, and is provided with a shoulder 26 adapted to abut the upper portion of a cover plate 27 clamped between shoulder 26 and the upper portion 18 of the faucet body. An annular groove 28 is formed in the outer surface of the bonnet below the shoulder 26 and the cover plate 27 to receive a seal 30, such as an O-ring. The bonnet has a bore extending from end to end thereof. The upper portion of the bore of the bonnet 22 is elongated, of reduced diameter, and is screw threaded. The lower part of the bore is of a larger diameter and cylindrical, thereby defining an annular shoulder 36 intermediate the ends of the bonnet. The mouth at the lower end of the bore of the bonnet is preferably beveled at 38.

A valve stem 40 has an elongated threaded part 42 mating with the internal threaded bore 32 of the bonnet. The threaded portion 42 is preferably of a length greater than its diameter, and the threads are coarse, preferably of standard stub Acme configuration, ten to the inch in stems having one-half inch stem crest diameter. The portion of the stem above the threads is provided with a circumferential groove 44, and above the groove the stem is provided with longitudinal slots 46, preferably of V-shape and spaced uniformly around the circumference of the stem. Immediately below the threaded part 42 the stem has a slight circumferential enlargement 48 providing a shoulder which limits opening movement of the valve stem. A circumferential groove 50 is formed in the stem below the enlargement 48 and above a reduced stem portion 52. The lower end portion 54 of the stem is of slightly smaller diameter than portion 52 so as to provide a circumferential shoulder 54. End portion 54 is rounded at 58.

A valve closure member 60, which preferably is of substantially cup-shape, is mounted upon the lower end of the valve stem. Closure member 60 preferably has an end wall 62 and a tubular wall 64 projecting from the end wall. Tubular wall 64 has an outer diameter slightly less than the diameter of the bore 34 of the bonnet for free endwise movement in said bore, and is interrupted intermeidate its length by a circumferential groove 66 in which is seated sealing ring 68, such as an O-ring having frictional engagement with the wall of the bonnet and with the closure member 60. The bore of the cup-shaped closure member has an inner diameter slightly larger than the diameter of the lower portion 54 of the stem around which it fits. The bore of member 60 merges with the inner surface of the end wall 62 in a rounded portion 72 whose radius of curvature is preferably slightly less than the radius of curvature of the rounded end portion 58 of the stem. The upper portion of the bore of the closure member is of larger diameter than inner bore part and is of a dimension to receive the stem portion 52 with clearance. A reduced diameter circumferential lip 76, preferably of rounded cross sectional configuration, fits in the groove 50 of the stem and has an inner diameter slightly smaller than the diameter of the stem part 52. A concentric rib 78 preferably projects from the end wall 62 of the closure member, the same preferably being of V-shape in cross section so as to provide a beveled outer rib surface.

A suitable hand grip member 80 is mounted upon the upper end of the stem. Hand grip member 80 has a bore provided with ribs complementary to and mating with the slots 46 of the valve stem. An internal circumferential lip 82 is provided within the hand grip to interlock with the groove 42 of the stem.

Each of the bonnet 22, stem 40, closure member 60 and hand grip 80, and, if desired, the faucet body 10, may be molded from plastic material. One material found suitable for use in faucets for water in the range of temperatures common in domestic plumbing systems handling both hot and cold water is an acetal copolymer of ethyl cellulose thermoplastic known as Celcon, a product of Celanese Corporation of America, which has a high stress resistance at elevated temperatures in water systems. This material is cited as illustrative, and is not intended to be limiting, since other thermoplastic materials, such as Delrin, an acetal resin produced by E. I. duPont de Nemours and Company, are also usable for some or all of the parts of the valve.

One of the important characteristics of the valve construction is that its manufacture from a thermoplastic material will permit assembly of the parts of the valve with minimum requirement for use of screws and other fasteners to interconnect the parts. Thus, the closure member 60 can be assembled with the valve stem by merely applying or pressing it to place, the parts being held in such assembled relation by a snap fit of the upper lip 76 of the closure member in the groove 50 of the stem. When assembled, the closure member is rotatable upon and adapted to rock slightly relative to the stem. Similarly, the hand grip 80 may be assembled upon the upper end of the stem by simply pressing it upon the stem. These parts are held against separation by the snap fit of lip 82 of the grip 80 in the groove 44 of the stem. In this instance, the interfit of the ribs of the grip 80 in the grooves 46 of the stem ensures against relative rotation of the parts.

Another feature of importance in the construction is the use of O-rings and the avoidance of use of sealing gaskets or bib washers. Thus, an effective seal between the valve body and the bonnet is provided by the O-ring 30 to prevent leakage under the cover plate 27, and an effective seal between the bonnet and the closure member is provided by the O-ring 68. The O-ring 68 also serves the additional function of providing restraint against rotation of the closure member in the bonnet as the valve approaches or initially moves out of seated position relative to the valve seat 16.

Another important feature of the construction is the interfit of the inner part of the stem in the closure member with slight clearance to accommodate rotation of the stem without rotation of the closure member. This clearance, together with the difference in the radii of the curved surfaces 58 of the stem and 72 of the closure member accommodates a self-seating action of the closure member upon the valve seat in the event of slight inaccuracies between these two parts. The use of the tapered concentric rib 78 of the closure member also facilitates self-seating of the closure member on the valve seat.

The self-centering sealing contact of the closure member with the valve seat is also important from the standpoint that an effective seal can be provided without requiring the provision of a gasket or bib washer at the sealing point when the valve is closed. The use of plastic material and its ability to yield slightly under pressure also facilitates the sealing action without a bib washer.

Another important characteristic of the construction which facilitates the fabrication of the valve from plastic material is the elongated character of the threaded portion 32 of the bonnet in which the threads of the stem engage. This, together with the coarse nature of Acme threads employed at 32 accommodates transmission of pressure to the closure member by the valve stem without danger of the stripping of threads or excessive wear.

It is not essential that the valve be provided with beveled sealing surfaces between the closure member and the valve seat. Thus, as illustrated in FIG. 4, the valve body may have a flat valve seat 90 and the plastic cup-shaped closure member 92 may have a flat valving surface seating upon the seat surface 90 of the inlet member. The end wall of the plastic closure member 92 may have a central frusto-conical projection 94 of slightly smaller diameter than the bore of the inlet valve seat adapted to project therein and accommodating closely graduated control of the rate of flow upon partial or initial opening of the valve. The same features of freedom of relative movement between the stem and closure member mentioned above, together with the slight rocking fit of the closure member on the stem, may be provided, and these will ensure the positive sealing of the valve as it is closed.

Another alternate construction is illustrated in FIG. 5 which is similar to that shown in FIG. 4 in all respects except that it does not include the use of a conical projection on the closure member, and, instead, the closure member 96 may have a flat, continuous valving surface 98.

While the preferred embodiments of the invention have been illustrated and described, it will be understood that changes in the construction may be made within the scope of the appended claims without departing from the spirit of the invention.

What I claim is:

1. A valve assembly comprising
    a valve stem
    a bonnet encircling said stem and having screw threaded connection with said stem,
    said bonnet having an inner cylindrical bore,
    said stem having a reduced diameter inner end portion defining a shoulder,
    a cup-shaped closure member encircling said reduced stem end portion with slight clearance accommodating relative rotation of said stem and said closure member and limited rocking of said closure member on said stem,
    said stem having a circumferential groove adjacent said shoulder and said closure member having a circumferential internal lip at its open end seating rotatably in said groove in a snap fit, said shoulder groove and closure lip constituting circumferential interlocking components,
    said closure member having an end sealing surface adapted for sealing face contacting engagement with the valve seat of a valve body,
    a resilient seal encircling said closure member intermediate its length and frictionally engaging the cylindrical bore of said bonnet, said bonnet having an interfitting screw threaded connection with the valve body, and
    a resilient seal encircling said bonnet and engaging the valve body adjacently above said screw threaded connection, said bonnet including a shoulder spaced above parts of said valve body, a cover plate having marginal edges located between said bonnet shoulder and a said valve body part and being urged by said shoulder into a clamped engagement with said valve body.

2. A valve assembly as defined in claim 1, wherein each of said stem, bonnet and closure member is molded from plastic material.

3. A valve assembly as defined in claim 1, and a hand grip fitted non-rotatably upon and encircling the upper end of said stem,
    said stem and hand grip having interlocking parts engaging with a snap fit.

4. A valve assembly as defined in claim 1, wherein said stem and bonnet are molded from plastic material and the threads thereof are of coarse and stub character with threaded engagement between the parts being of an axial dimension approximately as great as the diameter of the stem, said threads being of the standard stub acme configuration with ten threads to the inch for each one-half inch of stem crest diameter.

5. A valve assembly as defined in claim 1, wherein said closure member is molded from plastic material and has a sealing engagement with the valve seat of the valve body.

6. A valve assembly as defined in claim 1, wherein said valve body has a frusto conical valve seat and the closure member is formed of plastic material and has a concentric frusto conical projection sealingly engageable with said valve seat.

* * * * *